Patented Dec. 30, 1947

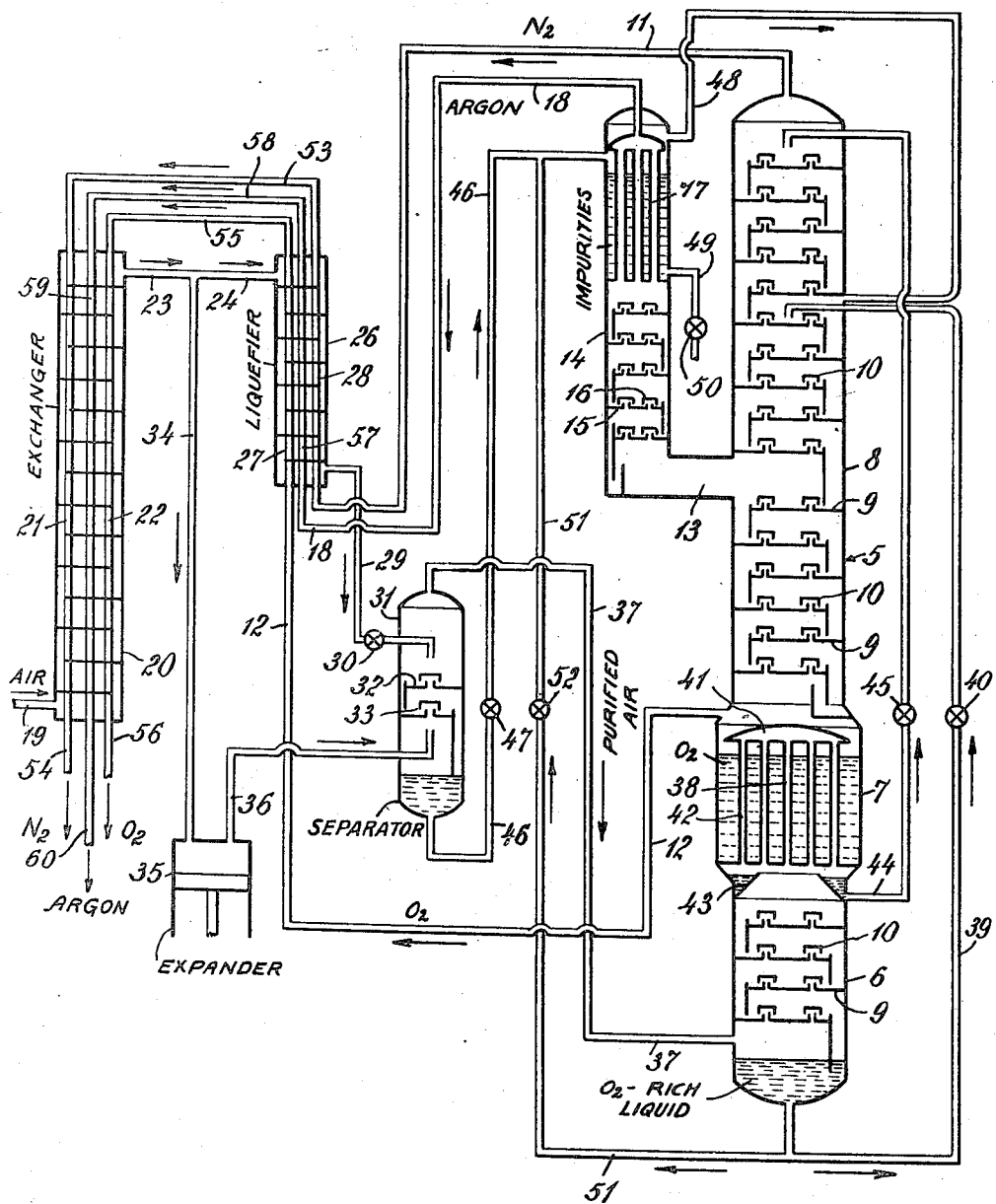

2,433,508

UNITED STATES PATENT OFFICE 2,433,508

SEPARATION OF THE CONSTITUENTS OF GASEOUS MIXTURES

Wolcott Dennis, Stamford, Conn., assignor to Air Reduction Company, Incorporated, New York, N. Y., a corporation of New York Application March 7, 1944, Serial No. 525,386

8 Claims. (Cl. 62—175.5)

This invention relates to the separation of the constituents of ternary gaseous mixtures by liquefaction and rectification and particularly to the recovery of oxygen, nitrogen and argon from air. The procedure, although described hereinafter with particular reference to the treatment of air, may be utilized in separating the constituents of other ternary gaseous mixtures.

In the commercial recovery of oxygen, nitrogen and argon from air, the problem of removing carbon dioxide, water, oil and hydrocarbons present therein introduces certain difficulties. Scrubbers may be utilized to treat the air before or after compression, but such devices are not completely effective, particularly in connection with oil and decomposition products thereof. Oil introduced by oil-lubricated compressors and hydrocarbons derived therefrom by decomposition are particularly troublesome. The accumulation of oil and other hydrocarbon compounds at points where oxygen or gases enriched in oxygen occur, is undesirable. Various procedures designed to prevent such accumulation have been suggested. These are generally complicated or introduce substantial losses in efficiency.

It is the object of the present invention to afford a simple and effective method whereby the three principal constituents of a ternary gaseous mixture may be recovered effectively and economically and wherein impurities in the gaseous mixture treated may be eliminated readily without interfering materially in the proper and efficient functioning of the desired separation and recovery of the constituents.

Other objects and advantages of the invention will be apparent as it is better understood by reference to the following specification and the accompanying drawing, which diagrammatically illustrates an apparatus suitable for the practice of the invention. Details of the apparatus which are well known in the art have been omitted for the purpose of clarity.

I have discovered that the impurities present in air which is supplied to a system designed to separate and recover oxygen, nitrogen and argon therefrom preliminarily may be concentrated in a liquid fraction of the air treated and that the refrigerative effect of the liquid can be recovered effectively by utilizing it to condense argon-oxygen vapor to form the reflux at the top of an argon separation column receiving vapor, rich in argon and oxygen, from an intermediate level of the final or low pressure rectifier of the main column at a point where the vapors contain a relatively large argon content and little if any nitrogen. The vapors from the liquid can be introduced to the final rectification in order to retain the valuable constituents thereof. By withdrawing a portion of the liquid in which the impurities are concentrated, the latter may be removed from the system. By this procedure the possibility that impurities and particularly oil and hydrocarbons derived therefrom, can be concentrated at a point where oxygen or vapors materially enriched in oxygen occur is eliminated. The products are free from such impurities. No substantial loss of the constituents or of refrigerative effect results from the procedure as described. A similar procedure can be utilized to prevent accumulation of impurities present in other ternary gaseous mixtures which are to be separated for the purpose of recovering the constituents thereof.

Referring to the drawing, 5 indicates a rectification column having a lower section 6, a condenser section 7 and a rectifier section 8. The sections 6 and 8 are provided with the usual trays 9 and bubble caps 10 to facilitate intimate contact of vapors and liquids flowing therethrough. At the top of the section 8 a pipe 11 permits the withdrawal of the effluent which, in the case of air, is principally nitrogen. Another product, for example oxygen, is withdrawn through a pipe 12 which is connected to the condenser section 7.

At an intermediate level of the section 8, the vapors formed in the rectification contain practically all of the argon present in the original gaseous mixture when air is treated. The balance of the vapor at this point is mainly oxygen. This vapor is withdrawn through an outlet 13, and delivered to an auxiliary column 14 having trays 15 provided with bubble caps 16. The vapor rises through the trays 15 in contact with liquid flowing downwardly thereover which is formed by the passage of the vapor through condenser tubes 17 which are surrounded by a liquid supplied as hereinafter described. The backward return condensation effected in the tubes 17 produces the liquid which flows over the trays 15. The unliquefied residue, consisting of a gas rich in argon, escapes through a pipe 18. The liquid from the trays 15 is delivered to the initial rectification.

The gaseous mixture to be treated, for example air, after compression to a suitable pressure, i. e. from 15 to 20 atmospheres absolute, drying in the usual equipment to remove substantially all of the moisture and initial cooling, is introduced through a pipe 19 to an exchanger 20, and after circulating about tubes 21 and 22 therein carrying cold products of the separation, the air is delivered to a pipe 23. A pipe 24 delivers a portion of the cooled air to a liquefier 26 wherein it circulates about tubes 27 and 28, carrying cold products of the separation. The air is liquefied and the liquid is delivered through a pipe 29 and pressure reducing valve 30 to a separator 31 having trays 32 and bubble caps 33 or other means for facilitating contact of liquid with vapors.

The remainder of the air is delivered through a pipe 34 to an expansion engine 35 of the usual type wherein the air is expanded with external work and thereby cooled. After expansion, the air is delivered through a pipe 36 to the separator 31. The air passes upwardly through the trays 32 of which any suitable number may be provided, in contact with the liquid air flowing downwardly thereover. Impurities present in the liquid and the vapor phase air are accumulated in the liquid which collects in the bottom of the separator. The preliminarily treated air, freed from such impurities, is delivered through a pipe 37 to the section 6 of the column. It passes upwardly through the trays 9 in contact with liquid produced as the air flows through tubes 38 of the condenser section 7 in heat exchange with liquid surrounding the tubes. As the result, a liquid accumulates in the bottom of the section 6 which is subsantially enriched in oxygen, usually containing approximately 40% of that constituent. This liquid is delivered through a pipe 39 and valve 40 to an intermediate level of the section 8 of the column.

That portion of the air which is not liquefied in the tubes 38 continues to a head 41 and thence downwardly through tubes 42. The liquid formed therefrom is gathered in a collector 43 from which it is withdrawn through a pipe 44 and valve 45 and delivered to the top of the section 8 of the column. This liquid is substantially pure nitrogen and affords the reflux liquid necessary to complete the separation of the constituents of the gaseous mixture by rectification.

The liquid from the separator 31 containing the accumulated impurities, is withdrawn through a pipe 46 controlled by a valve 47 and is delivered to the section of the auxiliary column surrounding the tubes 17. Here the liquid is partially evaporated by condensing argon enriched liquid from the vapors passing through the tubes 17. The vapor produced by evaporation of liquid surrounding the tubes is delivered through a pipe 48 to an intermediate level of the section 8 of the primary rectification column, so that the constituents may be recovered. A portion of the liquid containing the impurities concentrated therein may be withdrawn from time to time through a pipe 49 and valve 50 whereby the impurities are eliminated from the system. In the event that the liquid supplied from the separator 31 is insufficient to maintain the necessary refrigeration about the tubes 17, additional liquid may be withdrawn from the section 6 of the rectification column through a pipe 51 controlled by a valve 52 and thus added to the liquid supplied from the separator 31.

The effluent nitrogen is delivered by the pipe 11 to the tubes 28 of the liquefier 26 and thence by pipe 53 to the tubes 21 of the exchanger 20. It is withdrawn through the pipe 54 and may be delivered to the atmosphere or stored in any suitable container. The oxygen withdrawn through the pipe 12 is delivered to the tubes 27 of the liquefier 26 and thence through a pipe 55 to the tubes 22 of the exchanger 20. It is withdrawn through a pipe 56 and delivered to any storage receptacle. The argon which escapes through the pipe 18 is delivered to tubes 57 of the liquefier 26 and thence through a pipe 58 to tubes 59 of the exchanger 20. It is withdrawn through a pipe 60 and delivered to any suitable storage receptacle.

By the procedure as described, the impurities, and particularly oil and hydrocarbon derivatives, are removed from the gaseous mixture which is to undergo liquefaction and accumulated in a liquid. Refrigeration losses are avoided by vaporizing most of this liquid to separate oxygen from the argon accumulated at the intermediate level of the initial rectification. The refrigeration is thus conserved, and the vapors from the liquid are likewise retained and separated to recover the desired constituents. The only refrigerative loss other than the usual heat leak is the small amount of liquid carrying the impurities which is withdrawn from time to time to remove the impurities from the system.

Various changes may be made in the form and arrangement of the apparatus and in the details of the procedure without departing from the invention or sacrificing the advantages thereof.

I claim:

1. The method of separating the constituents of ternary gaseous mixtures by liquefaction and rectification which comprises liquefying a portion of a compressed and cooled gaseous mixture, preliminarily scrubbing the remainder of the gaseous mixture with the liquid portion thereof to provide a vapor free from impurities and a liquid in which the impurities are concentrated, subjecting said vapor to liquefaction to provide a gaseous effluent consisting substantially of the most volatile constituent and a liquid separate from the liquid previously formed during the preliminary scrubbing operation, consisting substantially of the two least volatile constituents substantially free from other impurities, withdrawing said gaseous effluent, subjecting said second liquid to rectification, withdrawing from an intermediate level of the zone of rectification a vapor containing the two least volatile constituents, and separating the more volatile constituent from the less volatile constituent of the withdrawn vapor by subjecting the withdrawn vapor to backward-return partial condensation by indirect heat exchange with said liquid containing the impurities, during which the less volatile constituent is condensed and the more volatile constituent passes off as an effluent gas.

2. The method of separating the constituents of ternary gaseous mixtures by liquefaction and rectification which comprises liquefying a portion of a compressed and cooled gaseous mixture, preliminarily scrubbing the remainder of the gaseous mixture with the liquid portion thereof to provide a vapor free from impurities and a liquid in which the impurities are concentrated, subjecting said vapor to liquefaction to provide a gaseous effluent consisting substantially of the most volatile constituent and a liquid separate from the liquid previously formed during the preliminary scrubbing operation consisting substantially of the two least volatile constituents substantially free from other impurities, withdrawing said gaseous effluent, subjecting said second liquid to rectification, withdrawing from an intermediate level of the zone of rectification a vapor containing the two least volatile constituents, separating the more volatile constituent from the less volatile constituent of the withdrawn vapor by subjecting the withdrawn vapor to backward-return partial condensation by indirect heat exchange with said liquid containing the impurities, during which the less volatile constituent is condensed and the more volatile constituent passes off as an effluent gas, said backward-return partial condensation of the withdrawn vapor resulting in partial vaporization of the liquid containing the impurities, and passing the vapor from said partial vaporization to the zone of rectification.

3. The method of separating the constituents of ternary gaseous mixtures by liquefaction and rectification which comprises liquefying a portion of a compressed and cooled gaseous mixture, preliminarily scrubbing the remainder of the gaseous mixture with the liquid portion thereof to provide a vapor free from impurities and a liquid in which the impurities are concentrated, subjecting said vapor to liquefaction to provide a gaseous effluent consisting substantially of the most volatile constituent and a liquid separate from the liquid previously formed during the preliminary scrubbing operation, consisting substantially of the two least volatile constituents substantially free from other impurities, withdrawing said gaseous effluent, subjecting said second liquid to rectification, withdrawing from an intermediate level of the zone of rectification a vapor containing the two least volatile constituents, and separating the more volatile constituent from the less volatile constituent of the withdrawn vapor by subjecting the withdrawn vapor to backward-return partial condensation by indirect heat exchange with said liquid containing the impurities, and to an auxiliary rectification with the liquid provided by the backward-return condensation, during which the less volatile constituent is condensed and the more volatile constituent passes off as an effluent gas.

4. The method of separating the constituents of ternary gaseous mixtures by liquefaction and rectification which comprises liquefying a portion of a compressed and cooled gaseous mixture, preliminarily scrubbing the remainder of the gaseous mixture with liquid portion thereof to provide a vapor free from impurities and a liquid in which the impurities are concentrated, subjecting said vapor to liquefaction to provide a gaseous effluent consisting substantially of the most volatile constituent and a liquid separate from the liquid previously formed during the preliminary scrubbing operation consisting substantially of the two least volatile constituents substantially free from other impurities, withdrawing said gaseous effluent, subjecting said second liquid to rectification, withdrawing from an intermediate level of the zone of rectification a vapor containing the two least volatile constituents, separating the more volatile constituent from the less volatile constituent of the withdrawn vapor by subjecting the withdrawn vapor to backward-return partial condensation by indirect heat exchange with said liquid containing the impurities, during which the less volatile constituent is condensed and the more volatile constituent passes off as an effluent gas, said backward-return partial condensation of the withdrawn vapor resulting in partial vaporization of the liquid containing the impurities, passing the vapor from said partial vaporization to the zone of rectification, and withdrawing the remainder of the liquid with the impurities.

5. The method of separating the constituents of ternary gaseous mixtures by liquefaction and rectification which comprises cooling a compressed gaseous mixture, liquefying a portion thereof by heat exchange with cold products of the separation, expanding the remainder of the gaseous mixture to a lower pressure, preliminarily scrubbing the expanded portion with the liquefied portion to accumulate a liquid containing impurities present in the gaseous mixture and to separate a vapor free from such impurities, subjecting said vapor to liquefaction to provide a gaseous effluent consisting substantially of the most volatile constituent and a liquid separate from the liquid previously formed during the preliminary scrubbing operation consisting substantially of the two least volatile constituents substantially free from other impurities, withdrawing said gaseous effluent, subjecting said second liquid to rectification, withdrawing from an intermediate level of the zone of rectification a vapor containing the two least volatile constituents, and separating the more volatile constituent from the less volatile constituent of the withdrawn vapor by subjecting the withdrawn vapor to backward-return partial condensation by indirect heat exchange with said liquid containing the impurities, during which the less volatile constituent is condensed and the more volatile constituent passes off as an effluent gas.

6. The method of separating the constituents of ternary gaseous mixtures by liquefaction and rectification which comprises, cooling the compressed gaseous mixture, liquefying a portion thereof by heat exchange with cold products of the separation, expanding the remainder of the gaseous mixture to a lower pressure, preliminarily scrubbing the expanded portion with the liquefied portion to accumulate a liquid containing impurities present in the gaseous mixture and to separate a vapor free from such impurities, subjecting said vapor to liquefaction to provide a liquid substantially free from impurities and separate from the liquid previously formed during the preliminary scrubbing operation, subjecting said second liquid to rectification, withdrawing from an intermediate level of the zone of rectification a vapor containing the two least volatile constituents, separating the more volatile constituent from the less volatile constituent of the withdrawn vapor by subjecting the withdrawn vapor to backward-return partial condensation by indirect heat exchange with said liquid containing the impurities, during which the less volatile constituent is condensed and the more volatile constituent passes off as an effluent gas, said backward-return partial condensation of the withdrawn vapor resulting in partial vaporization of the liquid containing the impurities, and passing the vapor from said partial vaporization to the zone of rectification.

7. The method of separating the constituents of ternary gaseous mixtures by liquefaction and rectification which comprises, cooling the compressed gaseous mixture, liquefying a portion thereof by heat exchange with cold products of the separation, expanding the remainder of the gaseous mixture to a lower pressure, preliminarily scrubbing the expanded portion with the liquefied portion to accumulate a liquid containing impurities present in the gaseous mixture and to separate a vapor free from such impurities, subjecting said vapor to liquefaction to provide a liquid substantially free from impurities and separate from the liquid previously formed during the preliminary scrubbing operation, subjecting said second liquid to rectification, withdrawing from an intermediate level of the zone of rectification a vapor containing the two least volatile constituents, separating the more volatile constituent from the less volatile constituent of the withdrawn vapor by subjecting the withdrawn vapor to backward-return partial condensation by indirect heat exchange with said liquid containing the impurities, during which the less volatile constituent is condensed and the more volatile constituent passes off as an effluent gas, said backward-return partial condensation of the withdrawn vapor resulting in partial vaporization of the liquid containing the impurities, passing the vapor from said partial vaporization to the zone of rectification, and withdrawing the remainder of the liquid with the impurities.

8. The method of separating the constituents of ternary gaseous mixtures by liquefaction and rectification which comprises cooling a compressed gaseous mixture, liquefying a portion thereof by heat exchange with cold products of the separation, expanding the remainder of the gaseous mixture to a lower pressure, preliminarily scrubbing the expanded portion with the liquefied portion to accumulate a liquid containing impurities present in the gaseous mixture and to separate a vapor free from such impurities, subjecting said vapor to liquefaction to provide a gaseous effluent consisting substantially of the most volatile constituent and a liquid separate from the liquid previously formed during the preliminary scrubbing operation consisting substantially of the two least volatile constituents substantially free from other impurities, withdrawing said gaseous effluent, subjecting said second liquid to rectification, withdrawing from an intermediate level of the zone of rectification a vapor containing the two least volatile constituents, and separating the more volatile constituent from the less volatile constituent of the withdrawn vapor by subjecting the withdrawn vapor to backward-return partial condensation by indirect heat exchange with said liquid containing the impurities and to an auxiliary rectification with the liquid provided by the backward-return condensation, during which the less volatile constituent is condensed and the more volatile constituent passes off as an effluent gas.

WOLCOTT DENNIS.

REFERENCES CITED

The following references are of record in the file of this patent:

UNITED STATES PATENTS

| Number | Name | Date |
|---|---|---|
| 1,619,909 | Wilkenson | Mar. 8, 1927 |
| 1,638,005 | Le Rouge | Aug. 2, 1927 |
| 1,557,907 | Van Nuys | Oct. 20, 1925 |
| 1,607,708 | Van Nuys | Nov. 23, 1926 |
| 2,287,158 | Yendall | June 23, 1942 |